Patented July 4, 1933

1,916,629

UNITED STATES PATENT OFFICE

RICHARD MICHEL, OF UERDINGEN, GERMANY, ASSIGNOR TO I. G. FARBENINDUSTRIE AKTIENGESELLSCHAFT, OF FRANKFORT-ON-THE-MAIN, GERMANY

MANUFACTURE OF CONDENSATION PRODUCTS FROM CARBAZOLE COMPOUNDS AND OLEFINES

No Drawing. Application filed December 3, 1928, Serial No. 323,573, and in Germany December 8, 1927.

The invention relates to new condensation products from olefines and compounds of the carbazole series and to a process of making the same.

I have found that carbazole and the halogenated and/or partially hydrogenated derivatives thereof readily react with olefines in the presence of catalytically acting substances to form alkyl derivatives or higher condensation products thereof.

Among the catalytically acting substances which have been found effective in uniting olefines with the said compounds of the carbazole series are metallic halides particularly aluminum chloride and iron chloride, addition compounds of, say, aluminum halides and olefines, and hydrosilicates of large surface, such as fuller's earth, Florida earth etc. With any of these catalysts there may be combined also other substances capable of promoting the reaction, such as, for example, benzene hydrocarbons and halogen acids.

The action of olefines upon carbazole is further promoted by causing the components to interact in the presence of an inert solvent viz. a solvent which reacts neither with the catalyst used nor the olefine or carbazole. Suitable solvents of this kind are, for example, petroleum ether, petroleum benzine, paraffin oil, or completely hydrogenated aromatic hydrocarbons such as hexahydrobenzene, hexahydrotoluene, dekahydronaphthalene and the like.

For effecting the condensation of olefines with a compound of the carbazole series it is not necessary to use the former in a pure or very concentrated state; the reaction my be effected with gaseous mixtures containing olefines, such as for example, the gaseous mixtures resulting from cracking operations, oil gas, and the like.

The conditions of temperature and pressure for carrying out my process may vary within certain limits and depend on the catalyst used. Generally the higher homologues of ethylene, such as propylene, butylene, hexylene etc. and cyclic olefines, such as cyclohexene, will more readily react than ethylene. The condensation will already take place at atmospheric pressure but advantageously it is accelerated by the application of superatmospheric pressure. The temperature of reaction is found to lie above 50° C. and in particular between 100 and 200° C. the most favorable results are obtained.

The resulting products are alkylated carbazoles or, by more intensified action, higher condensation products thereof. According to the relative proportions of the olefine and compounds of the carbazole series one or more moles of olefine combine with the compound of the carbazole series to form mono- or polyalkylated derivatives or higher condensation products of oily or resinous nature. Those alkyl derivatives wherein some of the alkyl groups contain more than one carbon atom, as well as all the higher condensation products have not been hitherto known.

The invention is illustrated by the following examples but not restricted thereto. The parts are by weight.

Example 1

In an autoclave 334 parts of carbazole and 35 parts of fuller's earth (previously treated with a mineral acid, for example, hydrochloric acid, and dried at about 100° C.) are stirred with propylene gas under a pressure of about 15 atmospheres and at a temperature of about 150° C., until an increase in weight of 130 parts is attained. The hot reaction product is filtered and distilled under 1 mm. pressure (mercury gauge). Besides some unchanged carbazole there is obtained an odorless nearly colorless soft resinous body boiling from 210 to 240° C. at a pressure of 1 mm. (mercury gauge).

Example 2

334 parts of carbazole and 17 parts of anhydrous aluminum chloride are stirred with propylene gas under a pressure of about 12 atmospheres and at a temperature of from 90 to 100° C., until 240 parts of propylene have been absorbed. The reaction product is washed with water and distilled under 1 mm. pressure (mercury gauge); a clear colorless soft resin is obtained.

Example 3

334 parts of carbazole suspended in 400 parts of dekahydronaphthalene and 16 parts of anhydrous aluminum chloride are stirred with propylene gas under atmospheric pressure and at a temperature of about 100° C., until in the course of about 3 hours an increase in weight of about 160 parts is attained. After washing with water, besides some unchanged carbazole, a clear light colored resin is obtained boiling from 210 to 220° C. under a pressure of 1 mm. mercury. The resin may be regarded as a diisopropyl carbazole or a polymer thereof. Analysis gives the following results:

C found___ 86.17%   C calculated___ 86.05
H (found)_  8.84%   H calculated___  8.36
N found __  5.43%   N calculated___  5.56
Molecular
  weight found 251   calculated___ 251

Example 4

334 parts of carbazole, 400 parts of dekahydronaphthalene and 35 parts of fuller's earth are stirred with propylene gas under a pressure of about 15 atmospheres and at a temperature of from 130 to 150° C., until an increase in weight of about 250 parts is attained. After washing with water and distilling off the dekahydronaphthalene, distillation under 1 mm. pressure (mercury gauge) yields a clear colorless resin similar to that obtained in Example 2.

In the following claims the generic term "compound of the carbazole series" is used to denote carbazole, the homologues, halogenated and/or partially hydrogenated derivatives thereof, either singly or in admixture.

I claim:

1. Process which comprises reacting with an olefine upon a compound of the carbazole series in the presence of a hydrosilicate having a large surface.

2. Process which comprises reacting with an olefine upon a compound of the carbazole series in the presence of a hydrosilicate having a large surface at a temperature of at least 50° C.

3. Process which comprises reacting with an olefine upon a compound of the carbazole series in the presence of a hydrosilicate having a large surface at a temperature of at least 50° C. and under at least normal atmospheric pressure.

4. Process which comprises reacting with an olefine upon a compound of the carbozole series in the presence of a hydrosilicate having a large surface and an inert solvent at a temperature of at least 50° C. and under at least normal atmospheric pressure.

5. Process which comprises reacting with propylene upon carbazole in the presence of a hydrosilicate having a large surface and of an inert solvent at a temperature of from about 100 to about 150° C. and under at least normal atmospheric pressure.

6. Process which comprises reacting with propylene upon carbazole in the presence of a hydrosilicate having a large surface and being previously treated with a mineral acid and of an inert solvent at a temperature of from about 100 to about 150° C. and under at least normal atmospheric pressure.

7. As new products, condensation products from olefines and compounds of the carbazole series comprising polyalkylated derivatives wherein at least two of the alkyl groups of said derivatives contain more than one carbon atom.

8. As new products, condensation products from propylene and a compound of the carbazole series comprising polyisopropyl-carbazole compounds.

9. As new products, condensation products from propylene and carbazole comprising polyisopropyl-carbazoles.

10. As new products, the condensation products obtainable by reacting with a higher homologue of ethylene upon carbazole in the presence of a hydrosilicate the said condensation products comprising polyalkylated compounds of the carbazole series, being substituted by at least two alkyl groups containing more than one carbon atom.

In testimony whereof I have hereunto set my hand.

RICHARD MICHEL.